United States Patent [19]

Pawlowski

[11] Patent Number: 5,787,475
[45] Date of Patent: Jul. 28, 1998

[54] CONTROLLED PREFETCHING OF DATA REQUESTED BY A PERIPHERAL

[75] Inventor: Chester Walenty Pawlowski, North Chelmsford, Mass.

[73] Assignee: Digital Equipment Corporation, Maynard, Mass.

[21] Appl. No.: 869,694

[22] Filed: Jun. 5, 1997

Related U.S. Application Data

[63] Continuation of Ser. No. 918,541, Jul. 21, 1992.

[51] Int. Cl.$^6$ .................................................. G06F 7/00
[52] U.S. Cl. .......................... 711/137; 711/159; 359/853
[58] Field of Search ............................. 395/853, 855; 711/189, 133, 137, 142, 143

[56] References Cited

U.S. PATENT DOCUMENTS

| | | | |
|---|---|---|---|
| 3,898,624 | 8/1975 | Tobias | 340/172.5 |
| 4,371,924 | 2/1983 | Schaefer et al. | 711/137 |
| 4,489,378 | 12/1984 | Dixon et al. | 364/200 |
| 4,490,782 | 12/1984 | Dixon et al. | 364/200 |
| 4,774,654 | 9/1988 | Pomerene et al. | 364/200 |
| 4,788,641 | 11/1988 | Ishiguro et al. | 364/200 |
| 4,807,110 | 2/1989 | Pomerene et al. | 364/200 |
| 4,868,742 | 9/1989 | Gant et al. | 364/200 |
| 4,928,239 | 5/1990 | Baum et al. | 364/200 |
| 4,980,823 | 12/1990 | Lui | 364/200 |
| 4,994,962 | 2/1991 | Mageau et al. | 364/200 |
| 5,093,777 | 3/1992 | Ryan | 395/400 |
| 5,206,939 | 4/1993 | Yanai et al. | 395/400 |
| 5,317,718 | 5/1994 | Jouppi | 395/425 |
| 5,333,291 | 7/1994 | Grumbok et al. | 395/425 |
| 5,357,618 | 10/1994 | Mirsu et al. | 395/400 |
| 5,361,391 | 11/1994 | Westberg | 395/425 |
| 5,371,870 | 12/1994 | Goodwin et al. | 395/425 |
| 5,410,653 | 4/1995 | Macon, Jr. et al. | 395/250 |

*Primary Examiner*—Christopher B. Shin
*Attorney, Agent, or Firm*—Anne E. Saturnelli

[57] ABSTRACT

A method and apparatus for determining when an Input/Output (I/O) module should prefetch cache lines of data from main memory. Following a request for data from a peripheral, connected to an I/O bus which supports a flexible protocol allowing peripherals with various capabilities to operate, the I/O module will request a cache line of data from main memory containing a beginning portion of the requested data. The I/O module may then prefetch consecutive cache lines containing requested data according to the operating parameters of the peripheral requesting the data and the requested data. The I/O module may prefetch in such way that neither system bus bandwidth nor I/O bus bandwidth is wasted.

8 Claims, 5 Drawing Sheets

| ROW # | # OF DATA XFERS | DATA WIDTH | ADDRESS AD<4:2> | PREFETCH |
|---|---|---|---|---|
| 1 | 0 | X | X | NO |
| 2 | ≥9 | 32 | X | YES |
| 3 | 8 | 32 | 000 | NO |
| 4 | 8 | 32 | ≥001 | YES |
| 5 | 7 | 32 | ≥010 | YES |
| 6 | 6 | 32 | ≥011 | YES |
| 7 | 5 | 32 | ≥100 | YES |
| 8 | 4 | 32 | ≥101 | YES |
| 9 | 3 | 32 | ≥110 | YES |
| 10 | 2 | 32 | ≥111 | YES |
| 11 | 1 | 32 | X | NO |
| 12 | ≥5 | 64 | X | YES |
| 13 | 4 | 64 | 00X | NO |
| 14 | 4 | 64 | ≥01X | YES |
| 15 | 3 | 64 | ≥10X | YES |
| 16 | 2 | 64 | 11X | YES |
| 17 | 1 | 64 | X | NO |

FIG. 5

CONTROLLED PREFETCHING OF DATA REQUESTED BY A PERIPHERAL

This is a continuation of pending prior application Ser. No. 08/918,541, filed on Jul. 21, 1991 entitled METHOD AND APPARATUS FOR PREFETCHING DATA REQUESTED BY A PERIPHERAL.

FIELD OF THE INVENTION

The present invention relates generally to the transfer of data between the local memory of a computer system and a peripheral, and more particularly to the prefetching of cache lines of data from local memory which contain requested data such that system bus bandwidth and I/O bus bandwidth are efficiently utilized.

BACKGROUND OF THE INVENTION

The input/output (I/O) busses of many current computer systems may be complicated by flexible protocols which allow peripherals with various capabilities that reside on the I/O bus to request transactions with varying operating parameters. An I/O module may connect the computer system to an I/O bus where many different types of peripherals reside. A peripheral's request for data from the computer system's local memory, including main memory and cache to be described later, may require the computer system's interface to the I/O bus, e.g., the I/O module, to make many determinations as to the peripheral's capabilities and the operating parameters of the requested transfer. Following these determinations, the I/O modules must retrieve the requested data from the local memory.

Typical peripherals which may be found on a simple I/O bus include mass storage devices, for example, tape drives or disk drives. Other peripherals which may be found on more complicated I/O busses include intelligent modules with on-board processors or other I/O modules which may connect the I/O bus to other computer systems or other I/O busses.

In the past, to simplify the hardware on the I/O module, I/O busses generally implemented strict protocols. Often, these strict protocols limited the choice of peripherals to those which behaved in substantially the same manner. Even where the I/O bus protocol was flexible in permitting peripherals with varying capabilities, such as operating speed, to reside on the same I/O bus, the I/O bus would operate according to the capabilities of the least sophisticated peripheral. Therefore, more sophisticated peripherals resident on the I/O bus would be constrained by the use of a less sophisticated peripheral, i.e., faster peripherals would be forced to operate at the slower speed of the less sophisticated peripheral.

Peripherals available today may have many different capabilities of which a computer system could take advantage. Many peripherals are capable of transferring data at different rates of speed (operating speed) and over different numbers of I/O bus data lines, i.e., use different data widths, such as thirty-two bits, sixty-four bits, etc. Also, some peripherals may be capable of providing the I/O module with information about the data transfer, such as the amount of data to be transferred, which may allow the I/O module to operate more efficiently. In order to take advantage of these more sophisticated peripherals, I/O busses may employ flexible protocols which enable each peripheral to operate in an optimal way. I/O modules resident on these I/O busses may need to be more complex in order to interface with the I/O bus and also, in order to fully utilize the capabilities of each peripheral on the I/O bus.

Many current computer systems have a system bus which connects CPU modules to local memory modules, e.g., main memory, and I/O modules. Often, when an I/O module receives an I/O bus or system bus transaction the module will be required to transfer data to or retrieve data from main memory over the system bus. Many system busses require a certain amount of data to be transferred for each transaction. These systems have essentially broken main memory into blocks, and require that an entire block of data be requested from main memory or sent to main memory. This is especially true in systems which implement caching. A cache is a small fast memory located between the CPU and main memory which enables the CPU to access data faster than from main memory. If the data sought by the CPU is not found in the cache, the main memory is accessed. A block of data containing the sought after data is then transferred from the main memory to the cache memory. In a system which implements caching, data is transferred over the system bus in blocks known as cache lines. References herein to main memory include cache memory.

I/O modules may be used to control the transfer of data between peripherals and main memory. Unlike a CPU module, the I/O module will not generally re-use the data, and, therefore, the I/O module will need to retrieve data from main memory each time the I/O module receives a request for data.

I/O busses generally do not require peripherals resident on the I/O bus to transfer a predetermined amount of data (block or cache line) per transaction. Typically, each transaction requested by a peripheral may differ in the amount of data to be transferred. A peripheral may request less than a cache line of data in one transaction and greater than a multiple number of cache lines of data in another transaction. The data requested may also not be aligned on the addresses of the cache lines in main memory, which may require the I/O module to retrieve cache lines within which only a portion of the data requested by the peripheral is contained.

In the instances where the peripheral requests a segment of data which is larger than a cache line or several cache lines, the I/O module is required to request several cache lines of data from main memory to retrieve all the data. In other instances, the actual amount of data to be retrieved may be less than a cache line, in which case the I/O module must still retrieve a cache line and then send to the peripheral only the portion of the cache line containing the requested data. Even where the amount of data to be retrieved is less than a cache line, the I/O module may still need to request more than one cache line if the requested data is stored in two consecutive cache lines, i.e., not cache line aligned. The I/O module would then send to the peripheral the appropriate portions of each cache line.

After the I/O module receives a data request from a peripheral, the I/O module will send a request on the system bus for a block or cache line of data which will be supplied by main memory. The I/O module may then request the next consecutive cache line of data from main memory prior to it being needed (prefetch) or the I/O module may simply wait and make a request for the next consecutive block of data from main memory when or if it becomes needed.

Generally, in order to simplify the hardware on the I/O module, most I/O modules may either never prefetch or always prefetch. An I/O module that never prefetches only issues system bus requests for the next consecutive cache line of data from main memory when requested data contained within a previously retrieved cache line has been transferred on the I/O bus to the peripheral and the peripheral requires more data. An I/O module that always prefetches requests the next consecutive cache line of data from main memory when the I/O module has temporary storage space available to hold the prefetched cache line. Always prefetching insures that a block of data not yet needed is available to the I/O module for transfer on the I/O bus when needed. The method of always prefetching is based on an estimate of the probability that the data in the prefetched cache line might be needed by the peripheral, not that it is necessarily needed.

Never prefetching reduces the burden on the system bus since system bus requests are only issued for needed data, but this method wastes I/O bus bandwidth due to the fact that the I/O bus transaction may need to be stalled while a consecutive cache line containing needed data is retrieved from main memory. During this stall other peripherals resident on the I/O bus are prevented from using the I/O bus and other modules on the system bus wishing to access devices on the I/O bus are also prevented from so doing.

Always prefetching is optimal for long transactions, but may waste system bus bandwidth, often because the prefetched data will not be utilized. This prevents other modules resident on the system bus from accessing the system bus while it is used to retrieve unneeded data. There may also be some recovery time required by the memory module following a read, or another module might wish to access the unneeded cache line which was prefetched. An unnecessary cache line read could delay another module's access to that cache line following the prefetch of that cache line. Wasting system bus bandwidth causes system performance degradation. Therefore, it may be preferable to waste I/O bus bandwidth as opposed to system bus bandwidth if a choice must be made.

As previously mentioned, I/O modules usually only transfer data between the I/O bus and the system bus and vice-versa, and for each data request from a peripheral, the I/O module will need to transfer data contained within one or more cache lines of data to the peripheral. A caching scheme on the I/O module may check the cache first for the requested data and if the cache does not contain the requested data, a cache line containing the required data would be requested and stored in the cache. The caching scheme would handle all system bus requests for cache lines of data, but, because the I/O module may rarely reuse data, the cache would also rarely contain the data requested by the peripheral and, hence, a cache may not prevent wasted I/O bus or system bus bandwidth. Generally, extensive hardware is required to implement a cache and the added complexity and expense of a cache primarily for use on an I/O module to retrieve cache lines of data from main memory may not be justifiable nor effective.

It is therefore desirable to provide a method and apparatus which avoids the foregoing difficulties and optimizes data transfer between a system bus and an I/O bus to improve system performance. More particularly it is desirable to provide an improved I/O module which supports a flexible I/C bus protocol and variable prefetching schemes to accommodate peripherals with various capabilities. It is to these ends the present invention is directed.

SUMMARY OF THE INVENTION

The present invention provides a method and apparatus which retrieves data requested by a peripheral, resident on an I/O bus that supports a flexible protocol, from main memory in such a way that the computer system's performance is not degraded and the I/O bus is not stalled. The invention is preferably embodied in an I/O module which effects data transfer between main memory and the peripheral.

A method and apparatus in accordance with the invention achieves the foregoing and other objects by providing an I/O module that prefetches data in accordance with the operating parameters of both the peripheral requesting data and the requested data. In response to a peripheral's request for data, the I/O module requests a cache line of data from main memory which contains a beginning portion of the requested data as indicated by a starting address supplied by the peripheral. The I/O module then prefetches next consecutive cache lines from main memory which contain requested data.

BRIEF DESCRIPTION OF THE DRAWINGS

FIG. 5 is a chart showing a third embodiment of a prefetching method in accordance with the invention.

DETAILED DESCRIPTION OF PREFERRED EMBODIMENTS

As noted above, this invention involves a method and apparatus which determines when an Input/Output (I/O) module of a computer system should prefetch cache lines of data from main memory and then causes such cache lines to be prefetched. In response to a request for data from a peripheral, connected to an I/O bus of a computer system, the I/O module may request a cache line from main memory containing a beginning portion of the requested data. The I/O module may then prefetch consecutive cache lines containing requested data according to the operating parameters of both the peripheral requesting the data and the requested data. The I/O module prefetches in such way that minimizes wasting of system bus bandwidth and I/O bus bandwidth, as will now be described.

Figure 1:
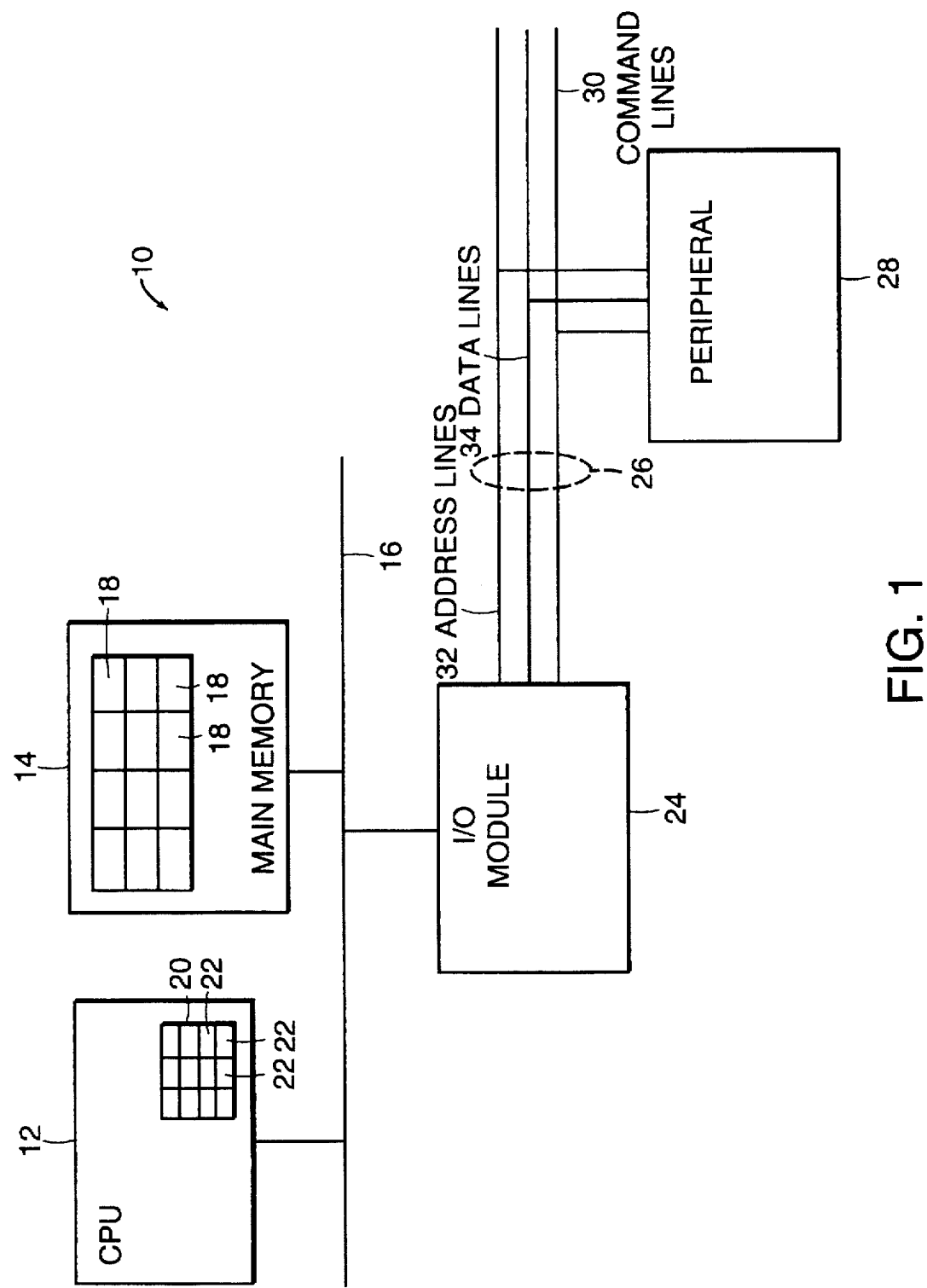
FIG. 1 is a block diagram of a computer system having a system bus connected to an I/O bus by an I/O module in accordance with the invention.

FIG. 1 illustrates a computer system 10 in accordance with the invention. As shown, the computer system may comprise a central processing unit (CPU) module 12 coupled to a main memory module 14 by a system bus 16. There may be multiple CPU modules and multiple main memory modules resident on the system bus, although only one of each is shown in FIG. 1 for simplicity. The system bus preferably supports caching, and the main memory is preferably segmented into a plurality of addressable cache lines 18. Each cache line stores a predetermined amount of data, such as, for example, a hexword or two hundred and fifty-six bits of data. All data transfers over the system bus must generally comprise an entire cache line worth of data. The CPU 12 may implement a cache 20 segmented into a plurality of blocks 22, each of which stores the same amount of data as a cache line 18 of main memory. An I/O module 24 may interface the system bus 16 to an I/O bus 26. Normally, the system bus operates many times faster than the I/O bus, and the I/O module is constructed to accommodate the different operating rates to transfer data between the I/O bus and the system bus. The I/O bus couples the I/O module to one or more peripherals, such as peripheral 28 shown in FIG. 1, that may have different capabilities. The I/O bus preferably has a flexible protocol which accommodates the many peripherals with varying capabilities that may be resident on the I/O bus and allows them to operate optimally.

The flexible protocols of the I/O bus 26 shown in FIG. 1 may be exemplified by the flexible Futurebus+ (FBUS) protocols as set forth in specifications provided by the Institute for Electrical and Electronic Engineers, including IEEE STD. 896.1-1991: Logical Layer Specification. The FBUS is a bus with which the present invention is particularly adapted to be used, and it will be described with respect to the FBUS protocols, assuming that the I/O bus may be an FBUS. It will be appreciated, however, that the invention has applicability to other types of busses and that this is illustrative of only one utility of the invention. A brief description of the FBUS will first be given before proceeding to describe the invention.

The FBUS is an asynchronous bus which allows all devices, i.e., modules or peripherals, resident on the FBUS to operate as fast as the individual devices can. A device, such as I/O module 24 or peripheral 28 shown in FIG. 1, that wishes to engage in a transaction must gain control of the bus through a process known as "arbitration". This is a protocol for choosing an FBUS master from among competing devices for a given period of time referred to as a "transaction". There are many different arbitration schemes known in the art. The FBUS employs a central arbiter (not shown) to which all devices on the FBUS wishing to gain control of the FBUS, i.e., become an FBUS master, send a bus request signal. The central arbiter grants control of the FBUS to one of the devices which sent a bus request signal according to a scheme which may fairly distribute such control among the various devices. The device which is granted control of the bus will not actually gain control until any current transaction is completed.

The physical FBUS comprises many electrical lines. Only a few are relevant to this discussion and will be described. The FBUS has a plurality of address/data (AD) lines 63-0 (AD<63:0>), data (D) lines 255-64 (D<255:64>), and command (CM) lines 7-0 (CM<7:0>). The FBUS master establishes a connection to another module referred to as an FBUS slave by sending an address on at least lines AD<31:0> and possibly on lines AD<63:32> to which the intended slave will respond. The command lines are used to transfer command information from an FBUS master to an FBUS slave. Through the command lines, the FBUS master may request data from an FBUS slave, i.e., read, or may send data to an FBUS slave, i.e., write. Data may be transferred between the master and the slave over lines D<255:64> and lines AD<63:0>. As shown in FIG. 1, the I/O module 24 may be coupled to peripheral 28 through I/O bus 26, which may comprise command lines 30, address/data lines 32, and data lines 34, corresponding to FBUS lines CM<7:0>, AD<63:0>, and D<255:64>, respectively.

The present invention pertains to situations in which a peripheral is an I/O bus master and is requesting data from the I/O module that serves as an I/O bus slave. This provides a path between the I/O bus and the computer's system bus. The request for data may be from main memory or a cache resident on the system bus. All references herein to main memory include any caches resident on the system bus.

Each device on the I/O bus may have a range of addresses to which the device will respond. After being granted control of the I/O bus by the central arbiter (not shown), the peripheral may send an address on the address/data lines 32. When the address provided by the peripheral (I/O bus master) falls within the range of addresses to which the I/O module will respond, the I/O module becomes the I/O bus slave, thereby establishing a connection between the peripheral and the I/O module. The I/O module may then use the address as a starting address to determine a first cache line within main memory which stores at least a beginning portion of the requested data.

Figure 2:
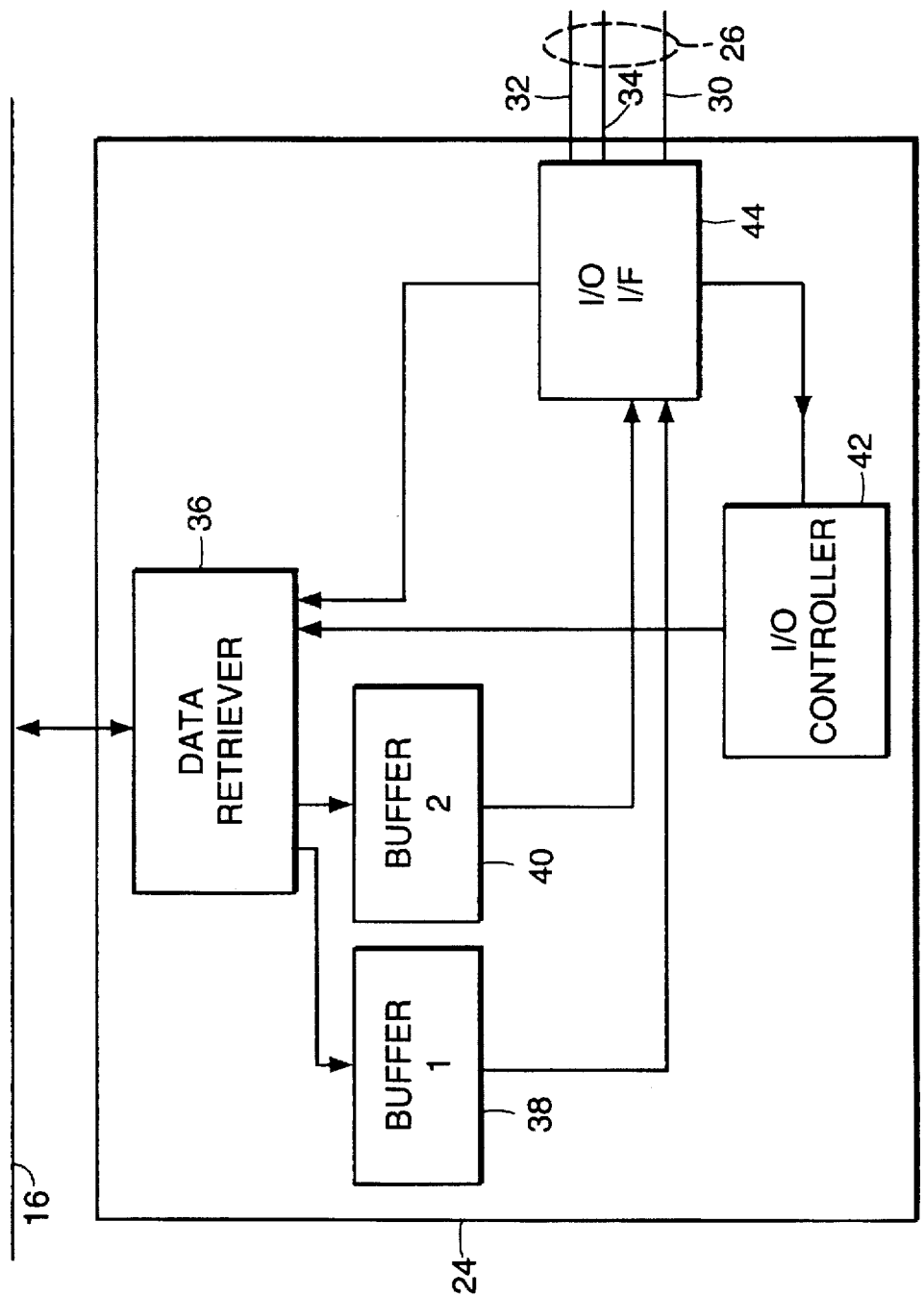
FIG. 2 is a more detailed block diagram of the I/O module of FIG. 1.

FIG. 2 is a more detailed illustration of the I/O module 24 shown in FIG. 1. The I/O module 24 may comprise a data retriever 36 which is adapted to supply the particular voltage levels to the system bus which are required by the system bus for interfacing thereto. The data retriever may also be capable of retrieving cache lines of data from main memory. At least two buffers 38 and 40 may be coupled to the data retriever for temporarily storing retrieved cache lines of data. The I/O module may further comprise an I/O controller 42 capable of determining whether cache lines consecutive to a first cache line containing a beginning portion of the requested data also contain requested data. The I/O controller may also be capable of causing the data retriever to prefetch those consecutive cache lines of data which have been determined to contain requested data. An I/O interface (I/F) 44 may be coupled to the I/O bus to supply the required voltage levels to the I/O bus. The I/O interface may be coupled to the buffers and capable of transferring requested data temporarily stored in the buffers to the peripheral.

Upon receiving a data request from peripheral 28 (FIG. 1), the I/O interface 44 may send the data retriever 36 the address supplied by the peripheral, hereinafter referred to as the starting address. The data retriever may then use the starting address to determine which cache line in main memory contains a beginning portion of the requested data, i.e., the first cache line. The data retriever may need to translate the starting address received from the peripheral into a system bus address if the addressing schemes for the two busses are different. For example, the FBUS is byte, i.e., eight bits, addressable which means that if the least significant FBUS address bits (AD<1:0>) equal a logic level pattern of "01", where logic level "0" represents a deasserted line and logic level "1" represents an asserted line, the address is of a second byte in an addressable location. If the system bus supports a cache line size corresponding to a hexword, where a hexword consists of two hundred and fifty-six bits, then the system bus will generally be hexword addressable. A system bus address with the least significant bits equal to a logic level pattern of "01" may be the address of the second hexword in an addressable location. The data retriever in such a computer system may determine which cache line of data contains the beginning portion of the data requested by the peripheral by ignoring FBUS lines AD<4:0> and using only the upper starting address bits on FBUS lines AD<63:5>. The data retriever may then arbitrate for the system bus to gain control of the system bus, and then use the system bus address translated from the starting address to request the first cache line containing the beginning portion of the requested data. An arbiter similar to the central arbiter, which was discussed above, or one which implements other arbitration schemes known in the art may be employed by the system bus.

As buffers 38 and 40 of the I/O module shown in FIG. 2 are filled by the data retriever with retrieved cache lines of data from main memory, the I/O interface 44 may transfer the requested data contained within the retrieved cache lines to the peripheral. The I/O interface may use the least significant five starting address bits, i.e., FBUS lines AD<4:0>, to index into the first retrieved cache line of data to begin transferring only the requested data to the peripheral. The I/O interface may then continue to transfer requested data, temporarily stored in the buffers as the buffers are filled with retrieved cache lines of data and as the peripheral (I/O bus master) requests data transfers.

The request from the data retriever for the first cache line of data from main memory 14 (FIG. 1) may not be serviced immediately on the system bus 16 if the system bus is being used for other transactions. At generally the same time that the I/O interface provides the starting address to the data retriever, the I/O interface may supply the operating parameters, provided by the peripheral making the data request, to the I/O controller. During the time required to retrieve the first cache line of data, the I/O controller may determine that a next consecutive cache line contains requested data. If so, the I/O controller may cause the data retriever to prefetch those consecutive cache lines of data as the buffers become available to temporarily store the prefetched cache lines of data. When prefetching a consecutive cache line of data, the data retriever may arbitrate for the system bus, increment the translated starting address, and use the incremented starting address to request the consecutive cache line of data from main memory. Depending on the system bus protocol, the data retriever may issue a second request for a consecutive cache line of data immediately after being notified by the I/O controller or the data retriever may have to wait until the first request is serviced.

The term "prefetching" as used herein indicates that a cache line of data is retrieved from main memory prior to the I/O interface being capable of transferring the requested data contained within the retrieved cache line to the peripheral. The I/O interface is incapable of immediately transferring the requested data due to its involvement with transferring requested data from a previously retrieved cache line to the peripheral for the same transaction.

The first cache line of data may be retrieved from main memory by the data retriever and temporarily stored in the first buffer 38. The I/O interface may then begin transferring the requested data contained within the first retrieved cache line of data to the peripheral. Meanwhile, the data retriever, after being directed to do so by the I/O controller, may retrieve the next consecutive cache line of data requested from main memory and temporarily store it in the second buffer 40. The I/O interface will not begin transferring the requested data stored within the consecutive cache line to the peripheral until all the requested data stored within the first cache line has been transferred to the peripheral.

Buffer 38 becomes available for the temporary storage of another cache line of data from main memory following the I/O interface's transfer of requested data contained within the first retrieved cache line of data from the buffer 38 to the peripheral. Then, while the I/O interface is transferring to the peripheral requested data contained within the first prefetched cache line of data temporarily stored in buffer 40, the data retriever may request a next consecutive cache line of data from main memory if the I/O controller has directed a second prefetch.

Each time requested data temporarily stored in a prefetched cache line of data is transferred to the peripheral from one buffer, the I/O interface may begin transferring any requested data stored in the other buffer. The data retriever may then prefetch another consecutive cache line of data from main memory if the I/O controller has directed another prefetch. I/O modules with more than two buffers available to temporarily store retrieved cache lines of data may work in a similar fashion. For instance, an I/O module with three buffers would be capable of prefetching two cache lines of data consecutive to the first cache line of data.

The I/O module 24 hardware including the I/O controller 42, data retriever 36, data buffers 38 and 40, and I/O interface 44 may comprise combinatorial logic elements ("AND" gates, "OR" gates, etc.) built through a combination of discrete components, programmable array logic (PAL) components, or integrated circuit components (i.e., gate arrays), etc., to perform the functions described herein. The I/O controller may also be implemented as a microprocessor controlled by a software program responsive to the operating parameters provided by the peripheral requesting the data transfer. It will be apparent from the following description that there are many possible implementations of the functions described herein, either through hardware or software or a combination of hardware and software, as will be well understood by those skilled in the art.

There are many types of operating parameters which may be supplied by peripheral 28 to I/O module 24 (FIG. 1) which the I/O module may utilize to optimize data transfers. Some busses have a variable data width, i.e., the bus protocol allows devices resident on the bus to use a portion of the number of lines available for data transfer. Hence, the number of lines or data width which will be used for data transfer during the current transaction is one useful operating parameter. Another useful operating parameter is the amount of data to be transferred during the current transaction.

The FBUS is a variable data width bus, i.e., although the FBUS provides a predetermined number of lines, D<255:64> and AD<63:0>, for data transfer between the master and the slave, the FBUS protocol allows an FBUS master through the command lines 30 (FIG. 1) to indicate which portion of the available lines will be utilized during the current transaction for data transfer. The FBUS allows data transfer over data widths of thirty-two bits (AD<31:0>), sixty-four bits (AD<63:0>), one hundred and twenty-eight bits (D<127:64>, AD<63:0>), or two hundred and fifty-six bits (D<255:64>, AD<63:0>).

Each transfer of data over the data width specified by the command lines is termed a "data beat" in the FBUS IEEE specification 896.1, and will be referred to herein as a data transfer. The FBUS protocol again through the command lines also allows FBUS masters, which have the capability to do so, to supply the FBUS slave with the number of data transfers which will be executed by the master during the current transaction.

For exemplary purposes, the cache line size of the system bus may be assumed to be a hexword, i.e., two hundred and fifty-six bits. Therefore, if an I/O bus master indicates that a data width of thirty-two bits on the I/O bus will be used for the current transaction, a number of data transfers equal to eight would be a request for a cache line of data. Similarly, if an I/O bus master indicates that a data width of sixty-four bits on the I/O bus will be used for the current transaction, a request for four data transfers would be a request for a cache line of data, etc.

If the amount of data to be transferred is larger than a cache line, then the I/O module will need to request at least two cache lines of data from main memory. An example of this, for the computer system described above, is where the I/O bus data width is thirty-two bits and the number of data transfers requested is greater than eight. Another example is where the I/O bus data width is sixty-four bits and the number of data transfers requested is greater than four. The I/O controller 42 (FIG. 2). using only the data width and number of data transfers, may determine that greater than a cache line worth of data is needed and that at least one consecutive cache line contains requested data. The I/O controller may then cause the data retriever to prefetch that consecutive cache line of data. The I/O bus may not be stalled waiting for the prefetched cache line of data to be retrieved from main memory. and the system bus bandwidth will not be wasted by an unnecessary cache line request from main memory. because the prefetched cache line will contain data requested by the peripheral.

Figure 3:
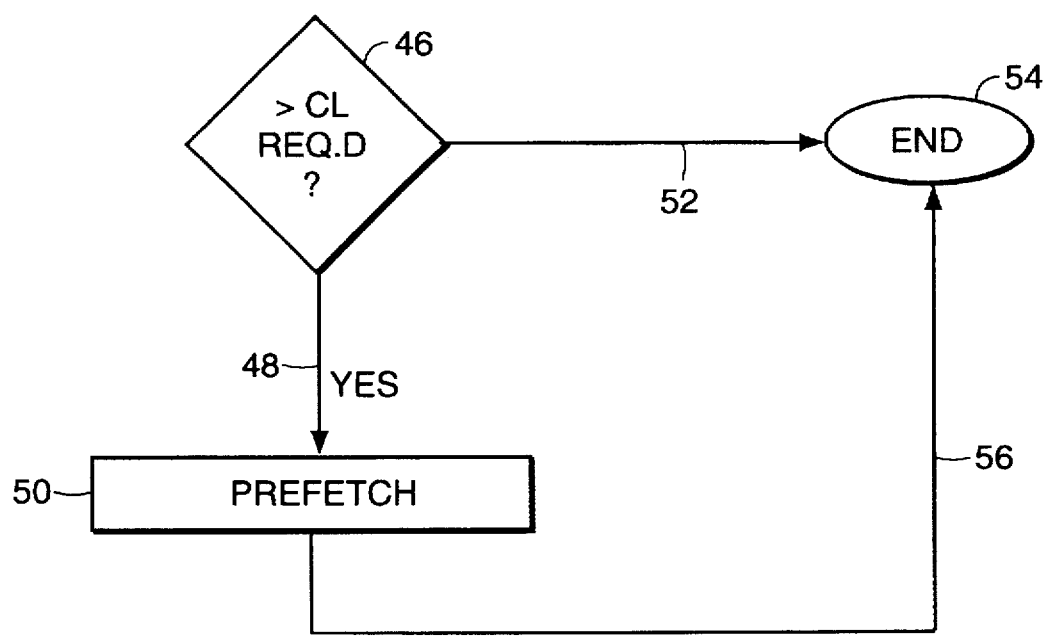
FIG. 3 is a flow chart showing a first embodiment of a prefetching method in accordance with the invention.
Figure 4:
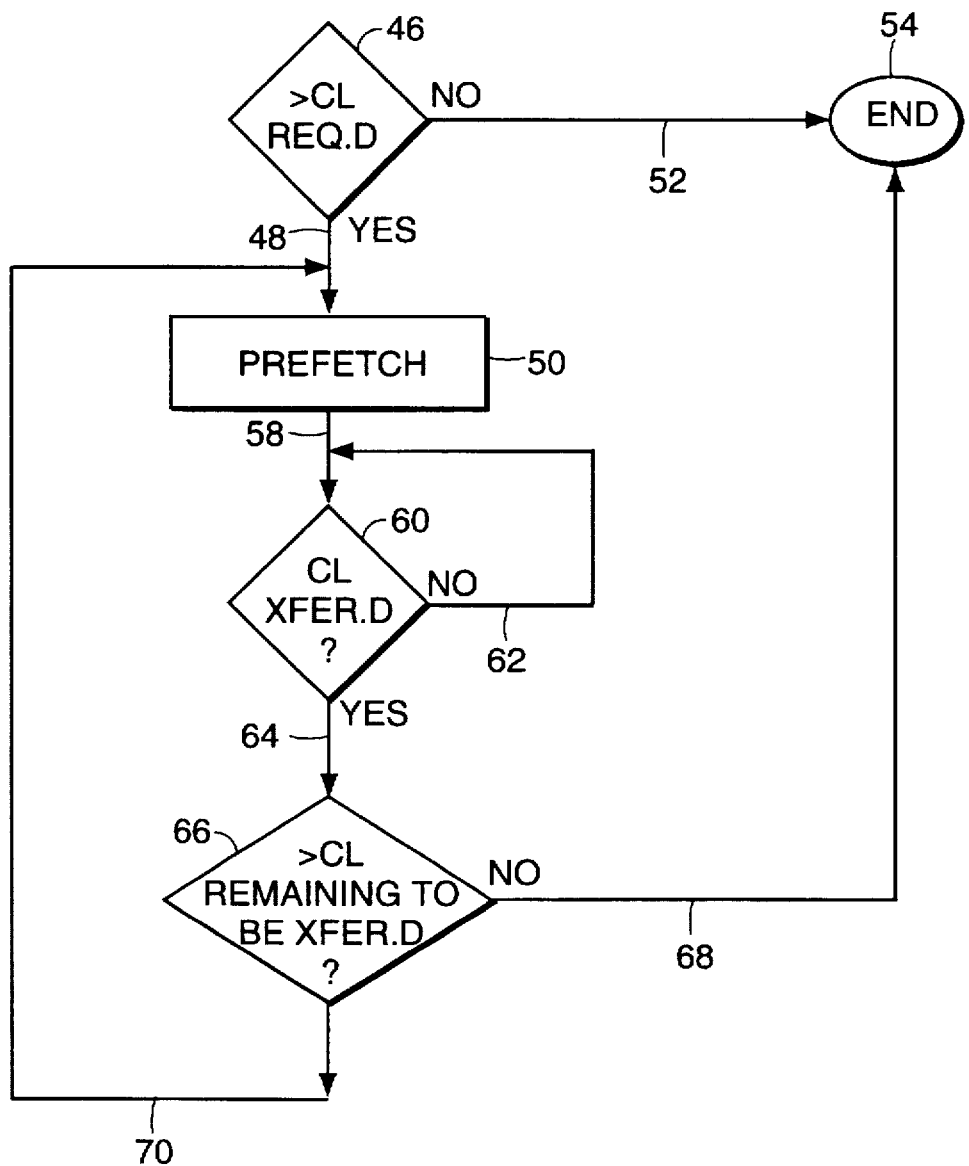
FIG. 4 is a flow chart showing a second embodiment of a prefetching method in accordance with the invention.

FIGS. 3, 4, and 5 illustrate preferred embodiments of the invention which may be implemented by the I/O module to determine whether to prefetch a cache line of data and then to accomplish the prefetch. As previously mentioned, there are many different possible implementations of the functions of the preferred embodiments described herein. Although possible implementations have been indicated herein, other implementations will be evident to those skilled in the art from the description that follows.

FIG. 3 is a flow chart illustrating a method which may be performed by the I/O controller to determine whether to prefetch one cache line of data based only on the data width and the number of data transfers. In the flow chart of FIG. 3 (and FIG. 4), diamond shapes represent decisions, rectangle shapes represent actions, and oval shapes represent the end of the flow chart. The decision block 46 in the flow chart of FIG. 3 represents the point where the I/O controller may determine whether the amount of data requested by the peripheral is greater whether the amount of data (>CL req.d?). This can be done in a number of ways using the data width and the number of data transfers. One way includes multiplying the data width by the number of data transfers to come up with the number of bits requested, and comparing that result to the number of bits in a cache line. If the cache line is, for example, a hexword or two hundred and fifty-six bits, and the result is greater than two hundred and fifty-six bits, the I/O controller may cause the data retriever to prefetch the next consecutive cache line of data to the first cache line that contains a beginning portion of the requested data. The flow chart of FIG. 3 represents this by the downward arrow 48 into the rectangle 50 marked "prefetch". Otherwise, the result is less than two hundred and fifty-six bits and the right arrow 52 on the flow chart represents that the determination by the I/O controller to prefetch is ended at 54 (end) without the I/O controller causing the next consecutive cache line of data to be prefetched. Following the prefetch step, the I/O controller may end its determination, as signified by the arrow 56 to oval 54. If the peripheral continues to request data transfers following the transfer by the I/O interface of requested data from the prefetched cache line of data to the peripheral, the I/O interface may cause the data retriever to request another consecutive cache line of data and then additional cache lines of data as the peripheral requests them.

An I/O controller which functions as the prefetching method described above and illustrated by FIG. 3 may be implemented in hardware and/or software. The I/O bus may be stalled during requests from main memory for consecutive cache lines of data which are not prefetched, but the system bus bandwidth will not be wasted with unnecessary cache line requests from main memory.

The I/O controller may implement a different prefetching method than the one depicted in FIG. 3, e.g., one in which the I/O controller causes the data retriever to prefetch more than one cache line of data when those cache lines contain requested data. Following the request by the data retriever for a first cache line containing a beginning portion of the requested data, the I/O controller may make a similar determination to the one discussed above. If the data width and the number of data transfers indicates that greater than one cache line is required for the data requested, the I/O controller may cause the data retriever to prefetch a cache line of data consecutive to the first cache line of data. Following the transfer by I/O interface to the peripheral of requested data contained in the first retrieved cache line, the I/O controller may determine whether the data which remains to be transferred is greater than one cache line. While the I/O controller is making this determination, the I/O interface may be transferring the requested data contained in the first prefetched cache line to the peripheral.

The I/O controller may make the determination to prefetch more than one cache line of data in many ways. One way includes adjusting the number of data transfers by the number of transfers executed between the I/O interface and the peripheral in transferring requested data contained in the first retrieved cache line. The I/O controller may then multiply the adjusted number of data transfers by the data width to come up with the number of bits of requested data which remain to be transferred to the peripheral. The I/O controller can then compare this result to the number of bits in a cache line, e.g., two hundred and fifty-six bits. If the result is greater than two hundred and fifty-six bits, this indicates that the I/O controller should cause the data retriever to prefetch another consecutive cache line of data. The result being greater than two hundred and fifty-six bits indicates that the first prefetched cache line of data does not contain all the requested data remaining to be transferred. Following each transfer to the peripheral of requested data contained in a prefetched cache line, the I/O controller may repeat this determination and cause the data retriever to prefetch additional consecutive cache lines of data when they contain requested data.

FIG. 4 illustrates a prefetching method of the foregoing type just described above. The first portion of the prefetching method illustrated by the flow chart of FIG. 4, i.e., that represented by decision block 46, prefetch block 50, ending oval 54, and arrows 48 and 52, may be similar to the method shown in the flow chart of FIG. 3. Hence, similar numbering is used to reflect this.

Following the original determination to prefetch, as described in reference to FIG. 3 above, the method of the flow chart of FIG. 4, as indicated by arrow 58 into decision block 60, checks to see if all the requested data stored in a retrieved cache line of data has been transferred to the peripheral (CL xfer.d?). If not, the I/O controller waits, signified by arrow 62, until the I/O interface has transferred all the requested data stored in the retrieved cache line to the peripheral. When all the requested data contained within the retrieved cache line has been transferred to the peripheral, i.e., arrow 64, the I/O interface begins transferring the requested data stored within another previously retrieved cache line of data. The I/O controller then determines, as represented by decision block 66, whether greater than a cache line of data remains to be transferred to the peripheral (>CL remaining to be xfer.d?).

This determination may be accomplished by the I/O controller in many ways, including the method discussed above of adjusting the number of data transfers and then using this adjusted number of data transfers to determine if greater than a cache line of data remains to be transferred to the peripheral. If less than a cache line of data remains to be transferred to the peripheral, the I/O controller may terminate the method, as represented in the flow chart of FIG. 4 by arrow 68 to ending oval 54. In this case, the previously retrieved cache line contains all the remaining requested data. If the amount of data remaining to be transferred is greater than a cache line, the I/O controller may cause the data retriever to prefetch another consecutive cache line of data from main memory, as indicated by arrow 70 leading into the prefetching block 50. The I/O controller may then proceed through the method represented by the flow chart of FIG. 4 and make the determinations outlined above.

An example of the I/O controller implementing the prefetching method as outlined above may be where the data width of the I/O bus is sixty-four bits and the original number of data transfers is nine. The data retriever may use a translated starting address to retrieve the first cache line containing a beginning portion of the requested data, and the I/O controller may cause the data retriever to prefetch the next consecutive cache line of data. A prefetch of a cache line of data is necessary, because, as previously mentioned, a number of data transfers equal to nine for an I/O bus data width of sixty-four bits indicates that more than a cache line of data has been requested by the peripheral, i.e., a number of data transfers equal to four with an I/O bus data width of sixty-four bits is a request for a cache line of data. The I/O controller may then adjust the number of data transfers by the number of transfers executed between the peripheral and the I/O interface. For example, if the entire first cache line retrieved from main memory contained requested data, the original number of data transfers (nine) may have the number four subtracted from it to yield a result (five) which would be the adjusted number of data transfers. The I/O controller may then use the adjusted number of data transfers, i.e., five, to determine if more than a cache line of data remains to be transferred. An adjusted number of data transfers of five with an I/O bus data width of sixty-four bits indicates that more than a cache line of data still remains to be transferred. Therefore, the I/O controller may cause the data retriever to prefetch the next consecutive cache line of data. After data requested by the peripheral and contained in the first prefetched cache line is transferred to the peripheral, a similar determination may be made, i.e., five (the adjusted number of data transfers)—four (an entire cache line worth of data)=one (less than a cache line of data, therefore, no prefetch).

In the prefetching methods described above, if less than a cache line of data is requested by the peripheral, the I/O controller may determine not to prefetch a next consecutive cache line of data. However, a consecutive cache line of data may be needed where the requested data is at such a location (address) as to be contained within two cache lines, i.e., not cache line aligned. The data retriever may request the first cache line containing a beginning portion of the data from main memory. Following the transfer to the peripheral of requested data contained in the first cache line, the I/O interface may cause the data retriever to request a next consecutive cache line containing the ending portion of the requested data due to the peripherals continued request for data transfers. The I/O interface may then transfer the ending portion of the requested data to the peripheral. The I/O bus may be stalled waiting for the request from main memory of the consecutive cache line containing the ending portion of the requested data, but system bus bandwidth is not wasted through unnecessary cache line requests.

In order to further increase the performance of the computer system and avoid a stall of the I/O bus, the I/O controller may implement a prefetching method which uses a number of different operating parameters, for instance, the number of data transfers, the I/O bus data width, and the starting address (AD<63:0>). If the starting address, the number of data transfers, and the I/O bus data width indicate that the requested data resides in consecutive cache lines, then the I/O controller may cause the data retriever to prefetch the needed cache lines of data. FIG. 5 is a chart illustrating an embodiment of the invention which utilizes such operating parameters.

Referring to FIG. 5, the right hand column of the chart, i.e., "Prefetch", represents those circumstances in which the I/O controller may cause the data retriever to prefetch the next consecutive cache line of data from main memory. The first column in the chart, i.e., # of Data Xfers, is the number of data transfers which is sent by the peripheral (I/O bus master) to the I/O module (I/O bus slave) through the command lines 30 (FIG. 1). The second column, i.e., Data Width, is the I/O bus data width sent by the peripheral through the command lines, and the third column, i.e., Address AD<4:2>, represents logic level patterns for the address bits AD<4:2> sent by the peripheral through the address lines 32 (FIG. 1). A "0" in the third column represents a deasserted address line, while a "1" represents an asserted address line. An "X" in the chart of FIG. 5 indicates that the value is irrelevant.

As described above, the FBUS is byte addressable. However, the smallest data width allowed by the FBUS protocol is thirty-two bits. Therefore, the least significant two FBUS address bits, i.e., AD<1:0>, are not relevant to this discussion. The system bus cache line size, as previously mentioned, may be a hexword of data. In that case, the data retriever need only use AD<63:5> to determine which cache line contains a beginning portion of the data requested by the peripheral. The I/O interface need only use AD<4:2> to index into retrieved cache lines to send the peripheral the requested data contained within the retrieved cache lines.

If the peripheral (I/O bus master) does not have the capability to determine the number of data transfers required for a particular transaction, the peripheral may send a number of data transfers equal to zero. This indicates that the peripheral will be operating in an "unrestricted" mode wherein it may request any amount of data from the I/O module. As shown in FIG. 5, in the first row of the chart, if the number of data transfers is zero, then the I/O controller may not cause the data retriever to prefetch a consecutive cache line of data, regardless (X) of the I/O bus data width or starting address. Each time the I/O interface transfers to the peripheral requested data contained within a cache line retrieved from main memory, and the peripheral requests more data transfers, the data retriever may increment the translated starting address and request the next consecutive cache line of data from main memory. The I/O bus may be stalled while waiting for consecutive cache lines of data to be retrieved from main memory, but system bus bandwidth will not be wasted by unnecessary cache line requests.

The second row of the chart of FIG. 5 illustrates the condition where the number of data transfers is greater than or equal to nine and the I/O bus data width is thirty-two bits. The I/O controller may cause the data retriever to prefetch a consecutive cache line of data regardless (X) of the address. As previously mentioned, a number of data transfers greater than eight with an I/O bus data width of thirty-two bits is a request for more than a cache line worth of data. The prefetching method depicted in FIG. 4 could be implemented by the I/O controller to transfer the requested data to the peripheral in this situation.

The third row of the chart of FIG. 5 illustrates the condition where the I/O bus data width is thirty-two bits, the number of data transfers is eight, and the least significant starting address bits are "000". The I/O controller may not cause the data retriever to prefetch a consecutive cache line of data. This situation is a request for a full cache line of data at a location (address) which is aligned on a cache line boundary, and, therefore, only the first cache line retrieved by the data retriever contains requested data.

The fourth row of the chart indicates that where the number of data transfers is eight, the I/O bus data width is thirty-two bits, and the least significant address bits are greater than or equal to "001", i.e., "001", "010", "011", "100", "101", "110", or "111", the I/O controller may cause the data retriever to prefetch a cache line of data that is consecutive to the first cache line which contains a beginning portion of the requested data. This is a situation where the amount of data requested is equal to a cache line of data, but the requested data is in a location (address) such that it is not cache line aligned, and, therefore, the requested data is contained in two consecutive cache lines. The I/O interface may index into each buffer storing a retrieved cache line of data to transfer to the peripheral the appropriate portions, the beginning and ending portions, of the requested data contained within each cache line.

The fifth through the tenth rows of the chart of FIG. 5 each illustrate a condition of a number of data transfers of less than a cache line of data with an I/O bus data width of thirty-two bits. The address column shows that if the least significant address bits are greater than or equal to the value shown, the I/O controller may cause the data retriever to prefetch a consecutive cache line of data. For example, in row nine where the number of data transfers is three, if the least significant address bits are "110" or "111", then the I/O controller may cause the data retriever to prefetch a consecutive cache line of data. These are additional situations where the requested data is less than a cache line of data, but in a location such that it is a part of two cache lines of data.

The eleventh row of the chart of FIG. 5 shows that a request by the peripheral with a number of data transfers equal to one and an I/O bus data width of thirty-two bits, regardless (X) of the address, requires no prefetch of a consecutive cache line of data. In this case, a number of data transfers equal to one can only be located within one cache line of data.

The last six rows of the chart of FIG. 5 cover an I/O bus data width of sixty-four bits. As previously mentioned, a number of data transfers equal to four with an I/O bus data width of sixty-four bits equals a cache line of a hexword. The twelfth row of the chart illustrates the condition where the number of data transfers is greater than or equal to five, the I/O controller may cause the data retriever to prefetch the next consecutive cache line of data regardless (X) of the address. The prefetching method depicted in FIG. 4 could be implemented by the I/O controller to transfer the requested data to the peripheral in this situation.

The thirteenth row of the chart of FIG. 5 illustrates the condition where the I/O bus data width is sixty-four bits, the number of data transfers is four, and the least significant address bits are "00X". The I/O controller may not cause the data retriever to prefetch a consecutive cache line of data. This situation is a request for a full cache line of data at a location which is aligned on a cache line boundary, and, therefore, only the first cache line retrieved by the data retriever contains requested data.

The fourteenth row of the chart illustrates the condition where the I/O bus data width is sixty-four bits and the least significant three address bits are greater than or equal to "01X". The I/O controller may cause the data retriever to prefetch the next consecutive cache line of data. This is a situation where the amount of data requested is equal to a cache line of data, but the requested data is in a location such that it is not cache line aligned, and, therefore, the requested data is contained in two cache lines. The data retriever may request from main memory a first cache line containing a beginning portion of the requested data, and the I/O controller may cause the data retriever to prefetch a consecutive cache line of data. The I/O interface may transfer to the peripheral the appropriate portion, the beginning and ending portion, of the requested data contained within each cache line.

The fifteenth and sixteenth rows of the chart of FIG. 5 each illustrate a condition of a number of data transfers of less than a cache line of data with an I/O bus data width of sixty-four bits. The address column shows that if the least significant address bits are greater than or equal to the value shown, the I/O controller may cause the data retriever to prefetch a consecutive cache line of data. These are additional situations where the requested data is less than a cache line of data, but in a location such that it is a part of two cache lines of data.

The seventeenth row of the chart of FIG. 5 shows that a request by the peripheral with a number of data transfers equal to one and an I/O bus data width of sixty-four bits, regardless (X) of the address, requires no prefetch of a consecutive cache line of data. In this case, a number of data transfers equal to one can only be located within one cache line of data.

As noted above, the functions set forth in the prefetching methods of FIGS. 3, 4, and 5 may be implemented in many ways well known to those skilled in the art, as, for example, in hardware such as discrete components, programmable logic array components, or integrated circuit components. The functions may also be implemented by a programmed microprocessor utilizing appropriate software.

Similar calculations may be made if the I/O bus data width is one hundred and twenty-eight bits or two hundred and fifty-six bits or if a different I/O bus is used which allows still other data widths. The calculations may also be similar if the system bus supports a different cache line size, etc.

The invention provides a method and apparatus for determining when an I/O module which receives a request for data from a peripheral may prefetch consecutive cache lines of data from main memory in such a way that minimizes wasting of system bus bandwidth and I/O bus bandwidth. The decision to prefetch is made by utilizing operating parameters related to both the peripheral initiating the data request and the requested data to determine which cache lines in main memory contain requested data. The invention is particularly well adapted for use with an I/O bus which supports a flexible protocol allowing peripherals with various capabilities to operate.

Although the foregoing description has been with reference to particular embodiments of the invention, it is to be understood that changes in these embodiments may be made without departing from the principles and spirit of the invention, the scope of which is defined by the appended claims.

What is claimed is:

1. A computer system comprising:
   a main memory having a plurality of storage locations, each of said plurality of storage locations storing a predetermined amount of data;
   a peripheral including means for issuing a request for requested data, and means for providing one or more operating parameters that characterize the peripheral and the requested data, said operating parameters including a starting address of the requested data stored in said main memory; and an input/output module, coupled to the main memory and the peripheral, comprising:

means for retrieving said requested data;

first determining means, responsive to the request, for determining a first storage location in said main memory, comprising a first portion of the requested data and corresponding to the starting address;

means for prefetching data from other storage locations in the main memory that are consecutive to said first storage location; and means for supplying to the peripheral said first portion of said requested data and means for discarding non-requested data stored in said first storage location; and wherein said prefetching data means further includes:

second determining means, responsive to the operating parameters, for determining whether said requested data is located in consecutive storage locations in said main memory, and means, responsive to the second determining means, for causing said retrieving means to prefetch a second portion of said requested data from one or more of said other storage locations which contain the requested data and are consecutive to the first storage location; and wherein the peripheral is coupled to the input/output module through an input/output bus having a predetermined number of data lines available for a data transfer between the input/output module and the peripheral, the operating parameters further including a data width indicating which of the data lines are used to transfer the requested data and the operating parameters further including a number of data transfers required to transfer the requested data to the peripheral.

2. A computer system according to claim 1, wherein a transfer comprises sending one bit of data over each of the data lines defined by the data width from the input/output module to the peripheral.

3. A computer system according to claim 1, wherein the second determining means utilizes the number of data transfers and the data width to determine whether the requested data exceeds the predetermined amount of data stored in a storage location, and if so, then the causing means causes the retrieving means to prefetch data from a storage location which is consecutive to the storage location which contains the beginning portion of the requested data.

4. A computer system according to claim 3, wherein, upon the requested data from a retrieved storage location being transferred to the peripheral, the second determining means determines, using the data width and an adjusted number of data transfers, whether the remaining portion of the requested data to be transferred to the peripheral exceeds the predetermined amount of data, and if so, the causing means causes the retrieving means to prefetch data from the next consecutive storage location.

5. A computer system according to claim 4, wherein, upon the second determining means determining that the requested data is less than the predetermined amount of data stored in a storage location, the second determining means utilizes the starting address, the number of data transfers, and the data width to determine whether an ending portion of the requested data is stored in a consecutive storage location, and if so, the causing means causes the retrieving means to prefetch data from the next consecutive storage location.

6. A method for an input/output module to retrieve requested data from a main memory for use by a peripheral the method comprising the steps of:

receiving a request for said requested data;

receiving operating parameters characterizing the peripheral and the requested data and including a starting address of said requested data stored in a first one of a plurality of storage locations that comprise said main memory, each of said plurality of storage locations storing a predetermined amount of data;

determining, using said starting address, said first storage location including a beginning portion of the requested data corresponding to the starting address;

requesting said beginning portion stored in said first storage location;

determining whether a second portion of the requested data is stored within one or more consecutive storage locations of said main memory;

prefetching said second portion;

receiving first data stored in said consecutive memory locations;

transferring to said peripheral only a part of said first data which was requested by the peripheral; and discarding nonrequested first data, and wherein the operating system parameters further include a data width, indicating which data lines are used to transfer the requested data to the peripheral, and a number of data transfers required to transfer the requested data, and wherein the step of determining a second portion of the requested data includes using the data width and the number of data transfers to determine whether a first size of said requested data exceeds the predetermined amount of data stored in a storage location.

7. A method according to claim 6, wherein, upon supplying the requested data from the received storage location to the peripheral, the second determining step includes utilizing the data width and an adjusted number of data transfers to determine whether the remaining portion of the requested data to be transferred to the peripheral exceeds the predetermined amount of data.

8. A method according to claim 7, wherein, upon determining that requested data is less than the predetermined amount of data stored in a storage location, the second determining step further utilizes the starting address, the number of data transfers, and the data width to determine whether an ending portion of the requested data is stored in a consecutive storage location.

* * * * *